July 15, 1969     D. A. EDGECOMBE     3,455,137

TUBE EXTRUSION APPARATUS AND METHOD

Filed Nov. 30, 1966

INVENTOR.
David A. Edgecombe

BY

*J. P. Moran*

ATTORNEY

United States Patent Office 3,455,137
Patented July 15, 1969

3,455,137
TUBE EXTRUSION APPARATUS AND METHOD
David A. Edgecombe, Beaver Falls, Pa., assignor to The Babcock & Wilcox Company, New York, N.Y., a corporation of New Jersey
Filed Nov. 30, 1966, Ser. No. 598,095
Int. Cl. B21c 23/04; B21d 37/16
U.S. Cl. 72—264                                    7 Claims

ABSTRACT OF THE DISCLOSURE

In tube extrusion, a hollow mandrel is cooled internally by a liquid coolant flowing spirally along the cylindrical inner surface of the mandrel wall, and a similarly flowing air blast subsequently evacuates all of the coolant from the mandrel. Such spiral flow is effected by an elongated manifold disposed within the mandrel and provided with lateral discharge passages, each extending substantially tangentially to the cylindrical inner surface of the manifold.

SPECIFICATION

This invention relates to the extrusion of tubes from hot billets, especially by means of ram-type apparatus utilizing a hollow mandrel within a die orifice, and more particularly to improved means for uniformly cooling the mandrel.

The uniform cooling of a mandrel ensures that it will not undergo longitudinal bending or warping because of differential thermal expansion and contraction. This problem has previously arisen in water-cooled hollow mandrels, such as when residual water within the mandrel effects greater cooling and consequent contraction of the lower portion of the mandrel than the upper portion. The present invention copes with this problem.

According to the present invention, there is provided improved means for cooling the mandrel to the desired temperature for the next extrusion operation. The improved mandrel cooling means comprises a fluid-conducting manifold disposed within the mandrel to define therewith an elongated annular cooling passageway for the liquid coolant and also for the air which evacuates the coolant. Preferably, the manifold comprises a long slender tube open at one end to receive pressurized coolant, with wall structure formed about a longitudinal axis conducting the coolant along its length. The manifold wall structure is provided with longitudinally spaced, lateral discharge passages which direct the coolant spirally through the annular cooling passageway. Thus, the coolant flows in one longitudinal direction within the manifold, and after issuing from the manifold the coolant flows spirally in opposite longitudinal direction while uniformly lowering the mandrel temperature by contact with its inner cylindrical surface.

The present invention involves a method of cooling the mandrel by flowing coolant in helical paths through the coolant passageway, followed by the step of evacuating coolant from the cooling passageway with pressurized air also flowing in helical paths therethrough. By thus cooling the mandrel and evacuating the coolant between extrusion strokes of the ram, the mandrel is uniformly cooled and therefore remains perfectly straight for the next extrusion operation.

A detailed illustration and description of a tube extrusion press to which the present invention is applicable is omitted for the sake of brevity and clearness, since such extrusion presses are well known to persons skilled in the art. It will suffice to say that the present invention was successfully applied to a 2500-ton tube extrusion press which operates at 3600 p.s.i. and is commercially available from Hydropress, Inc., of New York, N.Y.

Figure 1:
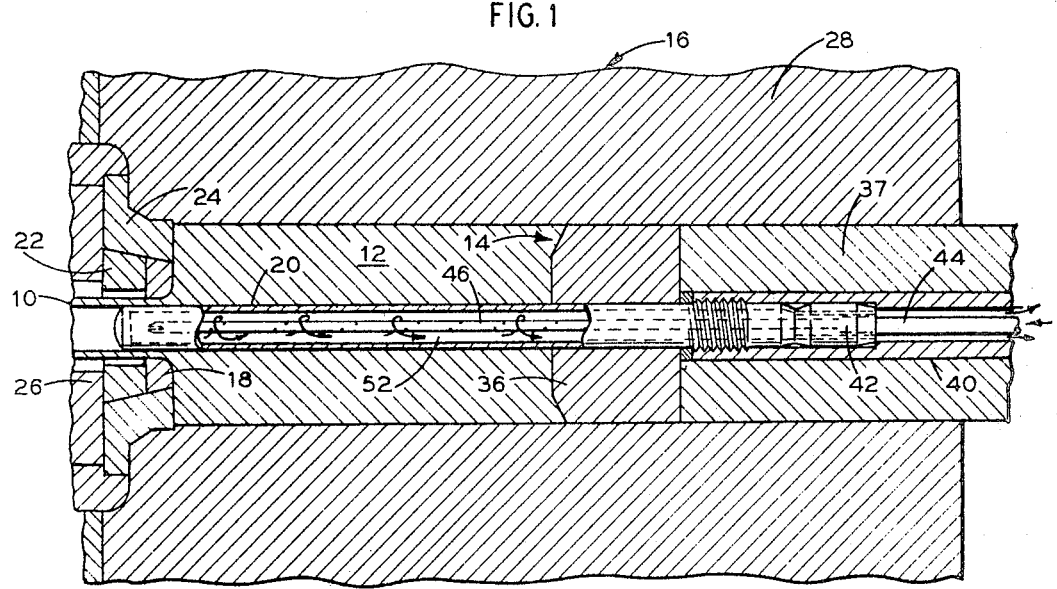
FIG. 1 is a fragmentary view, partly in elevation and partly in vertical section, of an extrusion press embodying the invention.

With reference to FIG. 1, a tubular product 10 is extruded from a hot metallic billet 12 in plastic condition under the compressive force of a ram assembly 14 moving within the body 16 of the extrusion press. The tubular product is formed in an annular extrusion passageway defined by a die 18 and a hollow, elongated mandrel 20 concentrically positioned within the orifice of the die 18.

The die 18 and a die backer 22 are positioned by a die holder 24; and these elements are held securely in place by a bolster 26 at the left hand end of the body 16 of the press, as seen in FIG. 1.

The body 16 of the press includes a hollow, cylindrical container 28, made in one or more parts, and preferably provided with suitable internal cooling means (not shown) for maintaining a desired temperature. The container 28 defines an extrusion chamber which receives the billet 12 and the movable mandrel 20 and ram 14. Preferably, all of these parts are coaxially disposed relative to one another and also the orifice of the die 18.

The ram 14 is a piston-like assembly comprising a dummy or pressure disc 36 adapted to make contact with the billet 12, and also a stem barrel 37 which transmits motive force to the dummy 36.

A central opening extending axially through the ram assembly 14 permits it to move in axial directions relative to a mandrel assembly slidably received therein. The mandrel assembly comprises the elongated, hollow, tubular mandrel 20 which, as mentioned previously, is positionable within the die orifice, and also a tubular mandrel holder 40 which receives the mandrel 20 and is secured thereto by a threaded connection between their mutually facing and axially overlapping surfaces. Also received within the mandrel holder 40 is a fluid coupling 42, the latter being held within an axial recess in the holder 40 by the abutting end of the mandrel 20.

Figure 3:
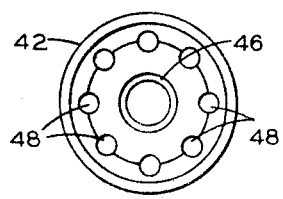
FIG. 3 is an end view of the fluid coupling of FIG. 2 but removed from the mandrel holder.
Figure 2:
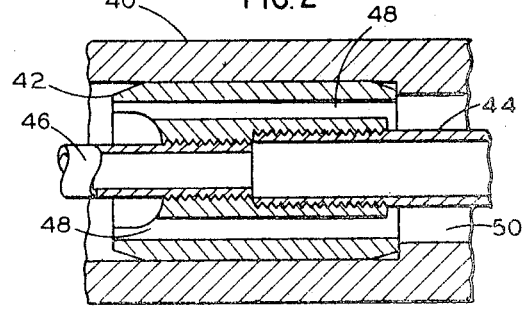
FIG. 2 is an enlarged, vertical sectional view of a fluid coupling within a mandrel holder, shown separately assembled with a coolant supply pipe and a coolant manifold.
Figure 4:
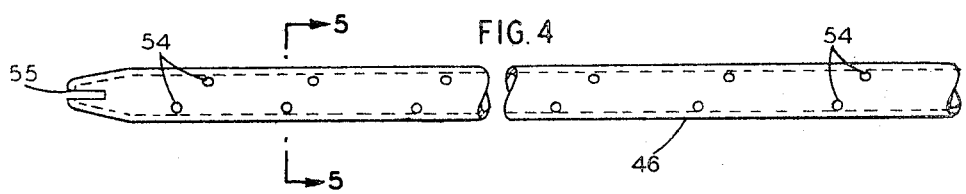
FIG. 4 is an elevational view of the manifold, but on a larger scale than in FIG. 1.

The fluid coupling 42 forms part of the mandrel cooling apparatus, since with suitable cooperating threads it establishes a fluid tight flow connection between a coolant supply pipe 44 and the coolant manifold 46 of the present invention. See FIGS. 2 and 3. The fluid coupling 42 also has an annular series of axially extending passages 48 disposed about the joint between the pipe 44 and the manifold 46. It is the function of the passages 48 to provide an avenue of exit for coolant returning from the manifold 46 and the mandrel 20 for discharge via the annular exit passage 50 provided between the supply pipe 44 and the mandrel holder 40.

The coolant manifold 46 is of circular cross section and held in cantilever fashion by the coupling 42 in coaxial relationship with the mandrel, and also so that an elongated annular cooling passageway 52 is defined by the outer surface of the manifold 46 and the inner surface of the mandrel 20. Coolant, preferably pressurized water at 80 p.s.i. and 80° to 120° F., is delivered for a controlled time period, e.g., 15 to 30 seconds, by the pipe 44 for axial flow through the interior of the manifold 46 in the direction of the die 18. Next the coolant is discharged from the manifold 46 through lateral discharge passages 54 therein into the cooling passageway 52, whereupon the coolant flows reversely, generally in the axial direction away from the die 18, thence through the passages 48 in the coupling 42 and finally the exit passage 50.

The present invention cools the mandrel 20 during and after each extrusion stroke of the ram 14 by directing the pressurized coolant spirally through the cooling passageway 52 to absorb heat from the mandrel wall, preferably with a timer and an electrically operated solenoid valve (not shown), and thereafter residual coolant is evacuated from the interior of the mandrel 20 preferably by a continuous blast of pressurized air (or other dry fluid) flowing spirally through the same passageway 52. The evacuating air is most suitably delivered to the passageway 52 by the same path as the coolant, i.e., the pipe 44 and the manifold 46; and it is preferred here also that a time and solenoid valve (not shown) be employed to control the duration of the air blast.

Figure 5:
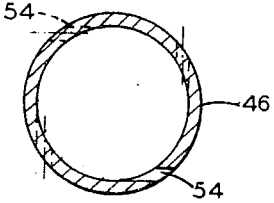
FIG. 5 is an enlarged transverse sectional view of the manifold, taken along line 5—5 of FIG. 4.

In order to direct the coolant, and also the evacuating air, in spiral or helical paths through the passageway 52, the lateral discharge passages 54 in the manifold 46 are bade to extend substantially tangent to the cylindrical inner surface of the manifold. See FIG. 5. Furthermore, the passages 54 are spaced from one another along a helical line on the outer surface of the manifold 46. Thus arranged, the passages 54 are longitudinally spaced apart and adjacent ones are staggered in annular relation to the axis so as to be out of axial alignment. The passages 54 also extend in respective planes that are normal to the axis of the manifold. An outlet 55 may also be formed at the free end of the manifold 46, as by crimping or in any other suitable manner, to ensure the delivery of coolant to the closed end of the mandrel 20.

From the foregoing it can be seen that the hollow mandrel 20 is cooled internally by liquid coolant delivered thereto by a manifold 46 disposed coaxially within the mandrel. Both the mandrel 20 and the manifold 46 have wall structure of annular cross section disposed about their common axis; and, since the outside diameter of the manifold 46 is considerably smaller than the inside diameter of the mandrel 20, the elongated annular cooling passageway 52 is provided between the inner surface of the mandrel and the outer surface of the manifold. Improved cooling of the mandrel is achieved by flowing the coolant spirally along the passageway 52 and by subsequently evacuating the coolant with pressurized air flowing in like manner. Such spiral flow is achieved by orienting the manifold discharge openings tangent to the inner cylindrical surfaces of the manifold. Thus, when pressurized fluid is introduced to the interior of the manifold 46 at its inlet or attached end the fluid flows axially along its length and exits therefrom in the aforementioned tangential direction, also flowing generally in opposite axial direction to an exterior point of lower pressure.

With apparatus constructed according to the invention it has been found that coolant flows through the passageway 52 with a spiral motion and cools the mandrel 20 uniformly with a helical cooling pattern, and that the coolant is completely evacuated from the passageway 52 with a blast of pressurized air which likewise flows spirally through the passageway 52 and discharges the residual coolant with a spinning action. By thus evacuating coolant from the passageway 52 between extrusion strokes the problem of nonuniform cooling of the mandrel 20 is eliminated. Also, the mandrel is cooled to the desired temperature, for example 400° to 600° F. or 500° F., and because of uniform cooling the mandrel remains perfectly straight for the next extrusion operation.

What is claimed is:
1. Extrusion apparatus including:
   (a) a die having an orifice,
   (b) a hollow mandrel positionable within said orifice to define with said die an annular extrusion passageway,
   (c) means for forcing material to be extruded through said extrusion passageway, and
   (d) improved means for cooling said mandrel comprising
      (e) a fluid-conducting manifold disposed within said mandrel to define an annular cooling passageway therebetween,
      (f) said manifold having annular wall structure formed about a longitudinal axis thereof and being open at an end portion to receive pressurized fluid,
      (g) said manifold wall structure having a cylindrical inner surface and being provided with discharge passages which direct pressurized fluid spirally through said cooling passageway, each of said discharge passages extends substantially tangentially relative to said inner surface.

2. Extrusion apparatus according to claim 1 wherein said discharge passages are disposed in respective planes that are normal to the longitudinal axis of said manifold.

3. Extrusion apparatus according to claim 2 wherein the inner surface of said mandrel is cylindrical, and the radial spacing between the inner surface of the mandrel and the outer surface of the manifold is substantially uniform.

4. Extrusion apparatus according to claim 2 wherein said mandrel and said manifold are long slender tubes disposed in coaxial relationship, said discharge passages are spaced apart along the length of said manifold, and further including means for supplying pressurized coolant to the interior of said manifold for internal flow in longitudinal direction opposite to the general longitudinal direction of flow through said cooling passageway.

5. Extrusion apparatus according to claim 4 further including means for supplying pressurized air to said manifold for effecting flow thereof in said manifold, out said discharge passages, and then spirally through said cooling passageway to evacuate coolant from said cooling passageway.

6. Extrusion apparatus according to claim 5 wherein the material being extruded is a hot billet of metal in plastic condition, and said forcing means includes a cylinder accommodating said billet and a ram movable within said cylinder.

7. In a method of extruding tubular articles by forcing hot material through an annular extrusion orifice defined by a die and a hollow mandrel within said die, the improvement of cooling said mandrel by the steps of:
   providing a fluid-conducting manifold within said mandrel to define an annular passageway between said manifold and said mandrel,
   supplying pressurized liquid coolant to said manifold and discharging the same therefrom in generally helical paths through said annular passageway for cooling said mandrel, and supplying pressurized air to said manifold and discharging the same therefrom in generally helical paths through said annular cooling passageway for evacuating coolant therefrom.

References Cited
UNITED STATES PATENTS

| | | | |
|---|---|---|---|
| 2,036,182 | 3/1936 | Singer | 72—265 |
| 2,231,761 | 2/1941 | Hill | 72—273 |
| 2,698,683 | 1/1955 | Martin | 72—264 |
| 2,866,545 | 12/1958 | Honkala | 72—264 |
| 2,950,816 | 8/1960 | Arenz | 72—342 |
| 2,983,373 | 5/1961 | Wells | 72—265 |

CHARLES W. LANHAM, Primary Examiner

A. L. HAVIS, Assistant Examiner

U.S. Cl. X.R.

72—342